US008057941B2

(12) United States Patent
Sienkowski et al.

(10) Patent No.: US 8,057,941 B2
(45) Date of Patent: Nov. 15, 2011

(54) COMPREHENSIVE METHOD FOR TRIGGERING ANODE BLEED EVENTS IN A FUEL CELL SYSTEM

(75) Inventors: Jon R. Sienkowski, Rochester, NY (US); David A. Arthur, Honeoye Falls, NY (US); Abdullah B. Alp, West Henrietta, NY (US); Prasad Gade, Webster, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 678 days.

(21) Appl. No.: 11/764,074

(22) Filed: Jun. 15, 2007

(65) Prior Publication Data

US 2008/0311442 A1 Dec. 18, 2008

(51) Int. Cl.
*H01M 8/04* (2006.01)
*H01M 8/24* (2006.01)

(52) U.S. Cl. ......... 429/428; 429/432; 429/444; 429/452

(58) Field of Classification Search .................. 429/427, 429/428, 430, 432, 433, 443, 444, 452
See application file for complete search history.

(56) References Cited

U.S. PATENT DOCUMENTS

| 4,310,605 | A | * | 1/1982 | Early et al. ................ 429/18 |
| 5,763,113 | A | * | 6/1998 | Meltser et al. ................ 429/13 |
| 6,140,820 | A | * | 10/2000 | James ................ 324/434 |
| 6,569,549 | B1 | * | 5/2003 | Sawyer ................ 429/13 |
| 2005/0130000 | A1 | * | 6/2005 | Ojima et al. ................ 429/22 |
| 2006/0035126 | A1 | * | 2/2006 | Kurrle et al. ................ 429/26 |
| 2006/0068243 | A1 | * | 3/2006 | Lienkamp ................ 429/13 |
| 2007/0231636 | A1 | * | 10/2007 | Alp et al. ................ 429/22 |
| 2008/0014472 | A1 | * | 1/2008 | Logan ................ 429/13 |
| 2008/0145715 | A1 | * | 6/2008 | Lienkamp et al. ................ 429/13 |

OTHER PUBLICATIONS

Kocha et al., "Characterization of Gas Crossover in PEM Fuel Cells", AIChE Journal, 52: 1916-1925, 2006.*

* cited by examiner

*Primary Examiner* — Barbara Gilliam
*Assistant Examiner* — Edu E Enin-Okut
(74) *Attorney, Agent, or Firm* — John A. Miller; Miller IP Group, PLC

(57) ABSTRACT

A method for triggering an anode bleed from split fuel cell stacks in a fuel cell system that employs anode flow-shifting. The method requests the bleed if any one of three different conditions are met. Those conditions include that the concentration of nitrogen in the anode side of the split stacks is above a predetermined percentage, the voltage spread between the maximum cell voltage and the minimum cell voltage of two fuel cells in the split stacks is greater than a predetermined spread voltage and the absolute value of the difference between the overall voltage of the two split stacks is greater than a predetermined voltage. The concentration of nitrogen in the anode can be determined in any suitable manner, such as by a nitrogen cross-over model or a sensor.

19 Claims, 2 Drawing Sheets

US 8,057,941 B2

COMPREHENSIVE METHOD FOR TRIGGERING ANODE BLEED EVENTS IN A FUEL CELL SYSTEM

BACKGROUND OF THE INVENTION

1. Field of the Invention

This invention relates generally to a method for triggering an anode bleed from a fuel cell stack and, more particularly, to a method for triggering an anode bleed from split fuel cell stacks that includes triggering the bleed if an estimated concentration of nitrogen in the anode is greater than a predetermined threshold concentration, triggering the bleed if the absolute value of the difference between the average split stack cell voltages is greater than a predetermined threshold voltage, or triggering the bleed if the voltage spread of the fuel cell voltages in either of the split fuel cell stacks is greater than a predetermined threshold voltage.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, referred to in the industry as nitrogen cross-over. Even though the anode side pressure may be slightly higher than the cathode side pressure, the cathode side partial pressures will cause air to permeate through the membrane. Nitrogen in the anode side of the fuel cell stack dilutes the hydrogen such that if the nitrogen concentration increases above a certain percentage, such as 50%, the fuel cell stack becomes unstable and may fail. It is known in the art to provide a bleed valve at the anode exhaust gas output of the fuel cell stack to remove nitrogen from the anode side of the stack.

It has been proposed in the art to provide stack order switching or anode flow-shifting in a fuel cell system that employs split stacks. Particularly, valves and plumbing in the system are provided so that the anode exhaust gas exiting a first sub-stack is sent to the anode of a second sub-stack, and the anode exhaust gas exiting the second sub-stack is sent to the anode of the first sub-stack in a cyclical manner.

SUMMARY OF THE INVENTION

In accordance with the teachings of the present invention, a method is disclosed for triggering an anode bleed from split fuel cell stacks in a fuel cell system that employs anode flow-shifting. The method commands the bleed if any of three different conditions is met. Those conditions include that the concentration of nitrogen in the anode side of the split stacks is above a predetermined percentage, the voltage spread between the maximum cell voltage and the minimum cell voltage of two fuel cells in either split stack is greater than a predetermined spread voltage and the absolute value of the difference between the average cell voltage of the split stacks is greater than a predetermined voltage. The concentration of nitrogen in the anode can be determined in any suitable manner, such as by a nitrogen cross-over model or a sensor.

Additional features of the present invention will become apparent from the following description and appended claims taken in conjunction with the accompanying drawings.

DETAILED DESCRIPTION OF THE EMBODIMENTS

The following discussion of the embodiments of the invention directed to a method for triggering an anode bleed from split stacks in a fuel cell system is merely exemplary in nature, and is in no way intended to limit the invention or its applications or uses.

Figure 1:
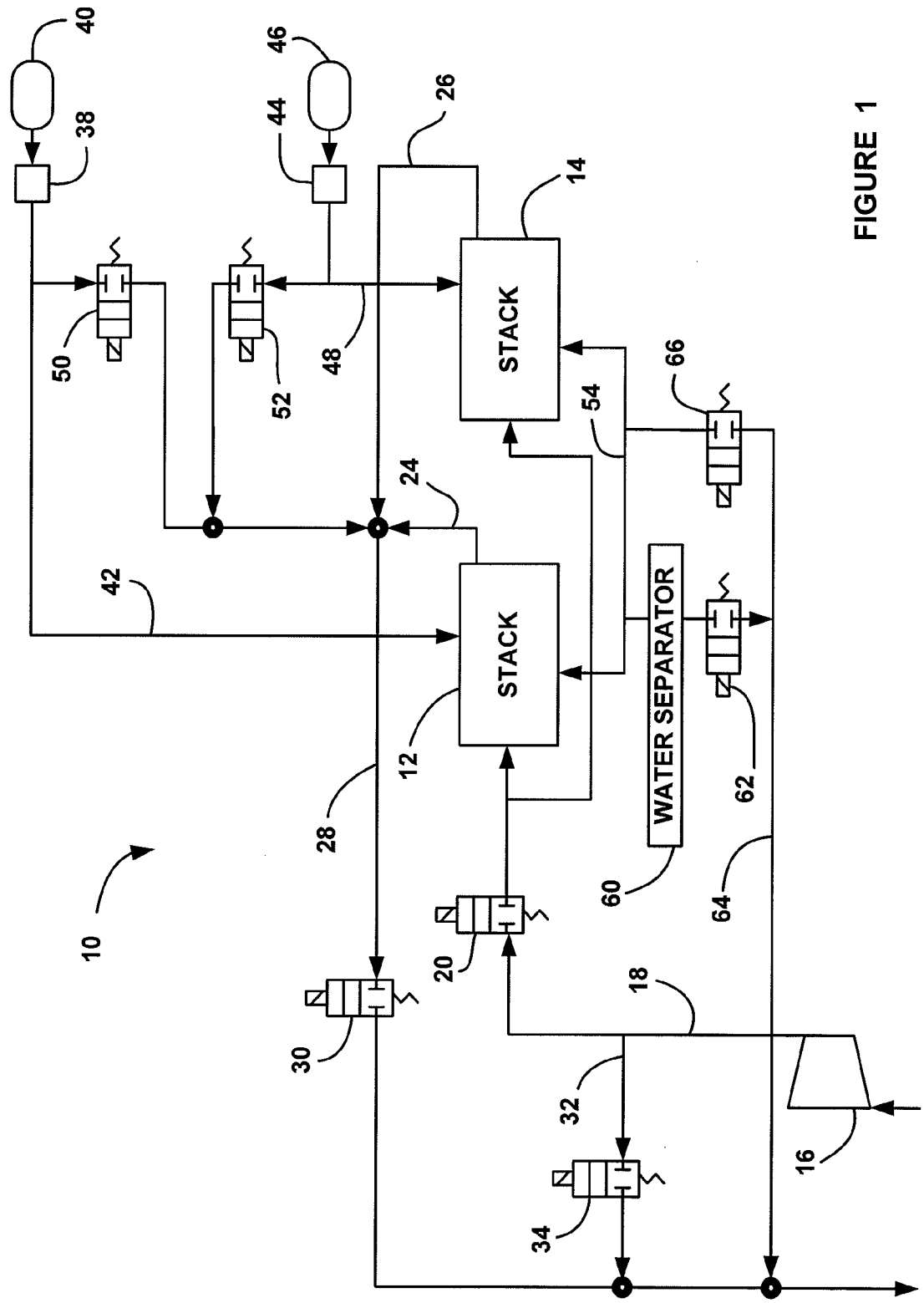
FIG. 1 is a schematic block diagram of a fuel cell system employing anode flow-shifting.

FIG. 1 is a schematic block diagram of a fuel cell system 10 including a first split fuel cell stack 12 and a second split fuel cell stack 14. A compressor 16 provides cathode input air on cathode input line 18 to the split stacks 12 and 14 through a normally closed cathode input valve 20. Cathode exhaust gas is output from the split stack 12 on line 24 and cathode exhaust gas is output from the split stack 14 on line 26 where the cathode exhaust gas is combined into a single cathode output line 28. A normally closed cathode back pressure valve 30 controls the flow of the cathode exhaust gas through the line 28. A cathode by-pass line 32 between the input line 18 and the output line 28 allows the cathode input air to by-pass the stacks 12 and 14. A normally closed by-pass valve 34 controls whether the cathode air by-passes the stacks 12 and 14. If the valves 20 and 30 are closed and the valve 34 is open, then air from the compressor 16 will by-pass the stacks 12 and 14. Typically, a cathode humidification unit (not shown) will be provided at a suitable location in the cathode input line 18.

In this non-limiting embodiment, the split stacks 12 and 14 employ anode flow-shifting where the anode reactant gas flows back and forth through the split stacks 12 and 14 at a predetermined cycle in a manner that is well understood to those skilled in the art. An injector 38 injects hydrogen gas from a hydrogen gas source 40 through anode line 42 to the split stack 12 and an injector 44 injects hydrogen gas from a hydrogen source 46 through anode line 48 to the split stack 14 in an alternating sequence.

A water separator 60 is coupled to the connector line 54 and collects water in the anode gas flow between the split stacks 12 and 14. A normally closed drain valve 62 can be employed that is periodically opened to vent the water to the cathode exhaust gas line 28 on line 64. Further, an anode exhaust gas purge valve 66 can be provided.

As discussed above, it is desirable to periodically bleed the anode side of the split stacks 12 and 14 to remove nitrogen from the anode side of the stacks 12 and 14 that may otherwise dilute the hydrogen and affect cell performance. Normally closed bleed valves 50 and 52 are provided for this purpose. When an anode bleed is commanded, the bleed valve 50 or 52 is opened and the bled anode exhaust gas is sent to the cathode exhaust gas line 28 depending on which direction the anode gas is currently flowing. Particularly, if the hydrogen gas is being injected into the split stack 12 from the source 40 when a bleed is triggered, then the bleed valve 52 is opened. Likewise, if the hydrogen gas is being injected into the split stack 14 from the source 46 when a bleed is triggered, then the bleed valve 50 is opened. The flow-shifting will typically occur several times during a normal bleed duration so that the bleed valves 50 and 52 have to be opened and closed several times in time with the flow switching.

A method for controlling the bleed valves 50 and 52 is proposed so that nitrogen is effectively removed from the anode side of the split stacks 12 and 14, and an efficient use of the hydrogen is maintained. As will be discussed below, an anode bleed is commanded when any one of three separate conditions is met.

Figure 2:
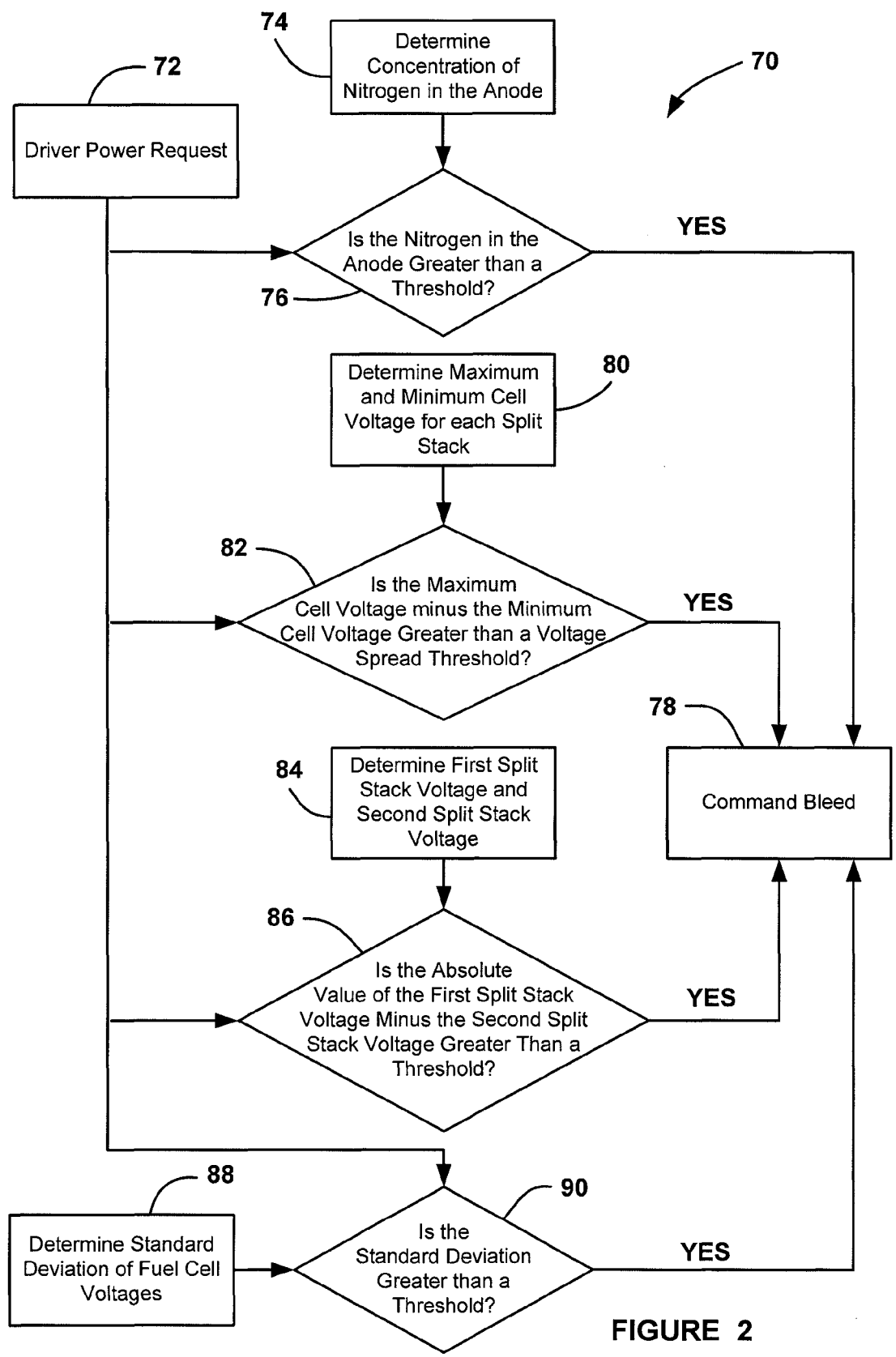
FIG. 2 is a flow chart diagram showing a process for triggering an anode bleed from the split stacks shown in FIG. 1, according to an embodiment of the present invention.

FIG. 2 is a flow chart diagram 70 showing a process for commanding an anode bleed, according to an embodiment of the present invention. A driver power request is provided at box 72 that is a signal indicative of the current density being generated by the split stacks 12 and 14. The concentration or percentage of nitrogen in the anode side of the split stacks 12 and 14 is determined in a proactive manner at box 74. A nitrogen cross-over model may be employed to determine the concentration of nitrogen in the anode side of the split stacks 12 and 14. Any suitable nitrogen cross-over model can be used for the purposes described herein, many of which are known in the art. Alternately, a sensor can be provided within the anode input flow line to provide a measurement of the nitrogen in the anode side of the split stacks 12 and 14 as long as it is robust enough for the wet fuel cell environment. A nitrogen bleed command is determined proactively in this manner because the bleed is not commanded until the nitrogen concentration becomes too high. This method is the primary method of triggering an anode bleed as long as the stack performance is stable, i.e., the stack voltages remain stable and uniform.

The driver power request signal and the concentration of nitrogen from the nitrogen model or the sensor measurement are sent to a decision diamond 76 that determines whether the concentration of nitrogen in the anode side of the split stacks 12 and 14 is greater than a predetermined threshold. If the concentration of nitrogen is above the predetermined threshold for a particular stack current density, then the algorithm initiates a bleed request at box 78.

The other two bleed triggers, sometimes referred to as bounce and spread, are characterized as reactive because they act as a safety once the stacks 12 and 14 become unstable. These methods look directly at cell voltages to characterize stack performance and stability.

At the same time as the nitrogen concentration in the anode side of the split stacks 12 and 14 is being determined, the maximum voltage of the fuel cells in one of the split stacks 12 and 14 and a minimum voltage of the fuel cells in the same split stack 12 or 14 are determined from cell voltage measurements by the algorithm at box 80. The maximum and minimum cell voltages and the driver power request signal are sent to a decision diamond 82 that determines whether the maximum cell voltage minus the minimum cell voltage is greater than a predetermined spread threshold. If the maximum cell voltage minus the minimum cell voltage is greater than the predetermined spread threshold, then it is determined that the stack is unstable. The algorithm determines that a nitrogen bleed is required to at least remove water from the anode flow field and provides the bleed request at the box 78. A large voltage spread between the maximum cell voltage and the minimum cell voltage is an indication of cell instability, which may be an indication of too much water in the anode side of the split stacks 12 and 14. This method of triggering an anode bleed is referred to in the art as the bounce method, and is a reactive technique for determining when an anode bleed is needed. The average cell voltage can be used instead of the maximum cell voltage.

The algorithm determines the average voltage of the fuel cells in both of the split stack 12 and the split stack 14 at box 84. The average cell voltages of the first and second split stacks 12 and 14 and the driver power request signal are sent to a decision diamond 86 that determines whether the absolute value of the difference between the first split stack average voltage and the second split stack average voltage is greater than a predetermined threshold. If the average cell voltage of the split stack 12 minus the average cell voltage of the split stack 14 is greater than a predetermined bounce threshold, then the algorithm also concludes that there is cell instability, probably from to much water in the anode flow field, and requests a bleed at the box 78. This process is a secondary indicator of nitrogen in the anode side of the split stacks 12 and 14, and is an excellent indicator of water accumulation in the second stack of a flow shifting system. This is the case because the second stack receives the lowest anode stoichiometry in the system until the flow is reversed. As water accumulates, stacks become especially anode stoichiometry sensitive. Therefore, this criterion adds an additional dimension to the determination of the concentration of nitrogen in the anode side.

Therefore, if any of the three techniques discussed above for determining that a nitrogen bleed is necessary or desired occurs, then the algorithm commands the anode exhaust gas bleed at the box 78. Thus, the anode bleed can be more reliable than if only a single one of the techniques was used. The length of the bleed is determined by many factors, including the current density output of the split stacks 12 and 14, as is well understood in the art.

It may be desirable to implement yet another bleed trigger, according to another embodiment of the invention. The algorithm calculates the standard deviation of the individual fuel cell voltages of the split stacks 12 and 14 at box 88. The standard deviation and the driver power request signal are provided to decision diamond 90 that determines if the standard deviation of the individual fuel cell voltages is greater than a predetermined standard deviation threshold, then the algorithm will trigger a bleed at box 78.

The threshold values referred to above can be adapted over the life of the split stacks 12 and 14. As the stacks age, cell voltages may become more spread out at a given stack current density. If the thresholds remain the same, the bleed command may be triggered all the time. Therefore, the thresholds can be increased as a function of stack hours. As an additional feature, this combination of triggers can act as variables to quantify stack stability. In other words, a stack is considered stable as long as neither the bounce nor the spread thresholds are exceeded. This can aide in post-processing and assessing the overall stack stability.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for commanding an anode bleed from an anode side of a fuel cell stack, said method comprising:
   determining the concentration of nitrogen in the anode side of the fuel cell stack;
   determining a maximum cell voltage of the fuel cells in the fuel cell stack;
   determining a minimum cell voltage of the fuel cells in the fuel cell stack; and
   commanding the anode bleed if the concentration of nitrogen in the anode side of the fuel cell stack is greater than a predetermined threshold concentration or the difference between the maximum cell voltage and the minimum cell voltage is greater than a predetermined spread voltage so that the anode bleed is commanded both proactively and reactively as a result of nitrogen in the anode side of the stack.

2. The method according to claim 1 wherein determining the concentration of nitrogen in the anode side of the fuel cell stack includes using a nitrogen cross-over model to estimate the nitrogen concentration.

3. The method according to claim 1 wherein determining the concentration of nitrogen in the anode side of the fuel cell stack includes measuring the concentration of nitrogen with a sensor.

4. The method according to claim 1 further comprising determining the standard deviation of the voltages of the fuel cells in the fuel cell stack, and wherein commanding the anode bleed includes commanding the bleed if the standard deviation is greater than a predetermined threshold standard deviation.

5. The method according to claim 1 wherein the fuel cell stack includes a first split stack and a second split stack that operate under anode flow-shifting.

6. The method according to claim 5 further comprising determining the absolute value of the difference between the average voltage of the fuels cells in the first split stack and the average voltage of the fuel cells in the second split stack, and wherein commanding the anode bleed includes commanding the bleed if the absolute value is greater than a predetermined bounce threshold.

7. The method according to claim 1 wherein the predetermined spread voltage is increased over the life of a fuel cell stack.

8. A method for commanding an anode bleed from an anode side of a first split stack and a second split stack that operate by anode flow-shifting, said method comprising:
   determining the concentration of nitrogen in the anode side of the first and second split stack;
   determining a maximum cell voltage of the fuel cells in one of the first or second split stacks;
   determining a minimum cell voltage of the fuel cells in the one first or second split stack;
   determining an average cell voltage of the fuel cells in the first split stack;
   determining an average cell voltage of the fuel cells in the second split stack; and
   commanding the anode bleed if the concentration of nitrogen in the anode side of the first and second split stacks is greater than a predetermined threshold concentration, the difference between the maximum cell voltage and the minimum cell voltage is greater than a predetermined spread voltage or the absolute value of the difference between the average cell voltage of the fuel cells in the first split stack and the average cell voltage of the fuel cells in the second split stack is greater than a predetermined bounce voltage so that the anode bleed is commanded both proactively and reactively as a result of nitrogen in the anode side of the stack.

9. The method according to claim 8 wherein determining the concentration of nitrogen in the anode side of the split stacks includes using a nitrogen cross-over model to estimate the nitrogen concentration.

10. The method according to claim 8 wherein determining the concentration of nitrogen in the anode side of the split stacks includes measuring the concentration of nitrogen with a sensor.

11. The method according to claim 8 further comprising determining the standard deviation of the voltages of the fuel cells in either the first split stack or the second split stack, and wherein commanding the anode bleed includes commanding the bleed if the standard deviation is greater than a predetermined threshold standard deviation.

12. The method according to claim 8 wherein the predetermined spread voltage and the predetermined bounce voltage are increased over the life of the split stacks.

13. A method for commanding an anode bleed from an anode side of a first split stack and a second split stack in a fuel cell system, said method comprising:
   using a proactive process for determining whether the anode bleed is necessary;
   using a first reactive process for determining whether the anode bleed is necessary;
   using a second reactive process that is different than the first reactive process for determining if the anode bleed is necessary; and
   commanding the anode bleed if any one of the proactive process or the first and second reactive processes indicates that an anode bleed is necessary so that the anode bleed is commanded both proactively and reactively as a result of nitrogen in the anode side of the stack.

14. The method according to claim 13 wherein using the proactive process includes determining the concentration of nitrogen in the anode side of the split stacks.

15. The method according to claim 14 wherein determining the concentration of nitrogen in the anode side of the split stacks includes using a nitrogen cross-over model to estimate the nitrogen concentration.

16. The method according to claim 14 wherein determining the concentration of nitrogen in the anode side of the split stacks includes measuring the concentration of nitrogen with a sensor.

17. The method according claim 13 wherein using a first reactive process includes determining a maximum cell voltage of the fuel cells in the first or second split stack, determining a minimum cell voltage of the fuel cells in the first or second split stack, and wherein commanding the anode bleed includes commanding the anode bleed if the difference between the maximum cell voltage and the minimum cell voltage is greater than a predetermined spread voltage.

18. The method according to claim 13 wherein using a second reactive process includes determining the absolute value of the difference between the average voltage of the fuel cells in the first split stack and the average voltage of the fuel cells in the second split stack, and wherein commanding the anode bleed includes commanding the anode bleed if the absolute value is greater than a predetermined bounce threshold.

19. The method according to claim 13 further comprising determining the standard deviation of the voltages in the first or second split stack, and wherein commanding the anode bleed includes commanding the bleed if the standard deviation is greater than a predetermined threshold standard deviation.

* * * * *